US006629027B2

United States Patent
Yamaguchi et al.

(10) Patent No.: US 6,629,027 B2
(45) Date of Patent: Sep. 30, 2003

(54) CONTROL DEVICE AND CONTROL METHOD FOR HYBRID VEHICLE

(75) Inventors: Musashi Yamaguchi, Kanagawa (JP); Susumu Komiyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/261,488

(22) Filed: Oct. 2, 2002

(65) Prior Publication Data

US 2003/0074115 A1 Apr. 17, 2003

(30) Foreign Application Priority Data

Oct. 11, 2001 (JP) .................................. P2001-313836

(51) Int. Cl.$^7$ .............................. B60K 6/00; G06F 19/00
(52) U.S. Cl. ...................... 701/22; 180/65.4; 477/3; 477/7; 60/710; 290/40 C; 290/40 R; 290/40 F; 318/152
(58) Field of Search ............. 701/1, 22; 180/65.1–65.4, 180/69.6; 477/3, 7; 60/706, 710; 290/40 C, 40 R, 40 F; 318/139, 151, 152, 153

(56) References Cited

U.S. PATENT DOCUMENTS

| | | | | |
|---|---|---|---|---|
| 5,713,814 A | * | 2/1998 | Hara et al. ...................... 477/5 |
| 5,939,794 A | * | 8/1999 | Sakai et al. ................. 290/40 A |
| 6,018,694 A | * | 1/2000 | Egami et al. ................. 701/102 |
| 6,083,138 A | * | 7/2000 | Aoyama et al. ................. 477/5 |
| 6,278,915 B1 | * | 8/2001 | Deguchi et al. ............... 701/22 |
| 6,314,347 B1 | * | 11/2001 | Kuroda et al. ................. 702/32 |
| 6,549,840 B1 | * | 4/2003 | Mikami et al. ................ 701/69 |
| 2001/0017227 A1 | * | 8/2001 | Amamo et al. ............ 180/65.2 |
| 2002/0062183 A1 | | 5/2002 | Yamaguchi et al. | |

* cited by examiner

Primary Examiner—Thomas G. Black
Assistant Examiner—Ronnie Mancho
(74) Attorney, Agent, or Firm—Foley & Lardner

(57) ABSTRACT

A control device and control method for a hybrid vehicle is disclosed having an electric storage detecting section 13 which detects a state of charge (SOC) of an electric storage device 10. A target running efficiency calculating section 14 serves as a unit to calculate a target value of a running efficiency, indicative of a proportion of a given physical quantity, in terms of a drive power rate required for driving the vehicle such that the higher the SOC detected value, the smaller will be the target value. A target unit operating point calculating section 15 calculates a target value of a unit operating point, providing the target running efficiency, from among operating points, that cause a power rate of an internal combustion engine 1 to be utilized at the running efficiency with the maximum efficiency, of a unit 11 (the internal combustion engine 1, a clutch 2, a motor 3 and a stepped power transmission 4), and a target unit operating point actualizing section 16 operates the unit 11 at the target unit operating point.

9 Claims, 12 Drawing Sheets

TARGET DRIVE POWER MAP tTd [Nm] vs VSP [km/h], θa

FIG.13

FUEL CONSUMPTION RATE [cc/sec]

TORQUE [Nm] vs ROTATIONAL SPEED [rad/s], HIGH / LOW

CONTROL DEVICE AND CONTROL METHOD FOR HYBRID VEHICLE

BACKGROUND OF THE INVENTION

The present invention relates to a control device and control method for a hybrid vehicle propelled with at least one of drive power outputs of an internal combustion engine and a motor via a stepped power transmission.

An example of a related art hybrid vehicle is disclosed in U.S. patent application Publication Laid-open No. 2002-0062183A1. With such a related art structure, the hybrid vehicle includes an internal combustion engine, a motor, an electric storage device and a power transmission to form a so-called hybrid vehicle in which at least one of drive power outputs of the internal combustion engine and the motor is transmitted via the power transmission to an output shaft thereof. In such a hybrid vehicle, a running mode and an operating point of a unit (the internal combustion engine, the motor and the power transmission) are determined such that the running efficiency (indicative of a proportion of a fuel flow rate, in terms of a drive power rate required for driving the vehicle, required for providing such power rate) is equal to a target value.

In such a concept, a target running efficiency is determined such that the higher the SOC value indicative of a remaining charged state of the electric storage device, the higher will be the target running efficiency. This results in a condition where the unit operating point is controlled such that as the SOC value remains at a high level, the electric storage device is charged only at the high running efficiency whereas when the SOC value remains at the low level, charging of the electric storage device is effectuated even at the low running efficiency. For this reason, it is possible to execute a control so as to permit the SOC value to be varied within an available range and to properly provide a given physical value, such as an exhaust gas flow rate and fuel consumption rate, related to the internal combustion engine.

In the related art practice set forth above, operating points of the internal combustion engine to be used during a travel of the vehicle are compared between a case in which the power transmission includes an infinitely variable power transmission, such as a CVT, and a case in which the power transmission includes a stepped power transmission.

Figure 1:
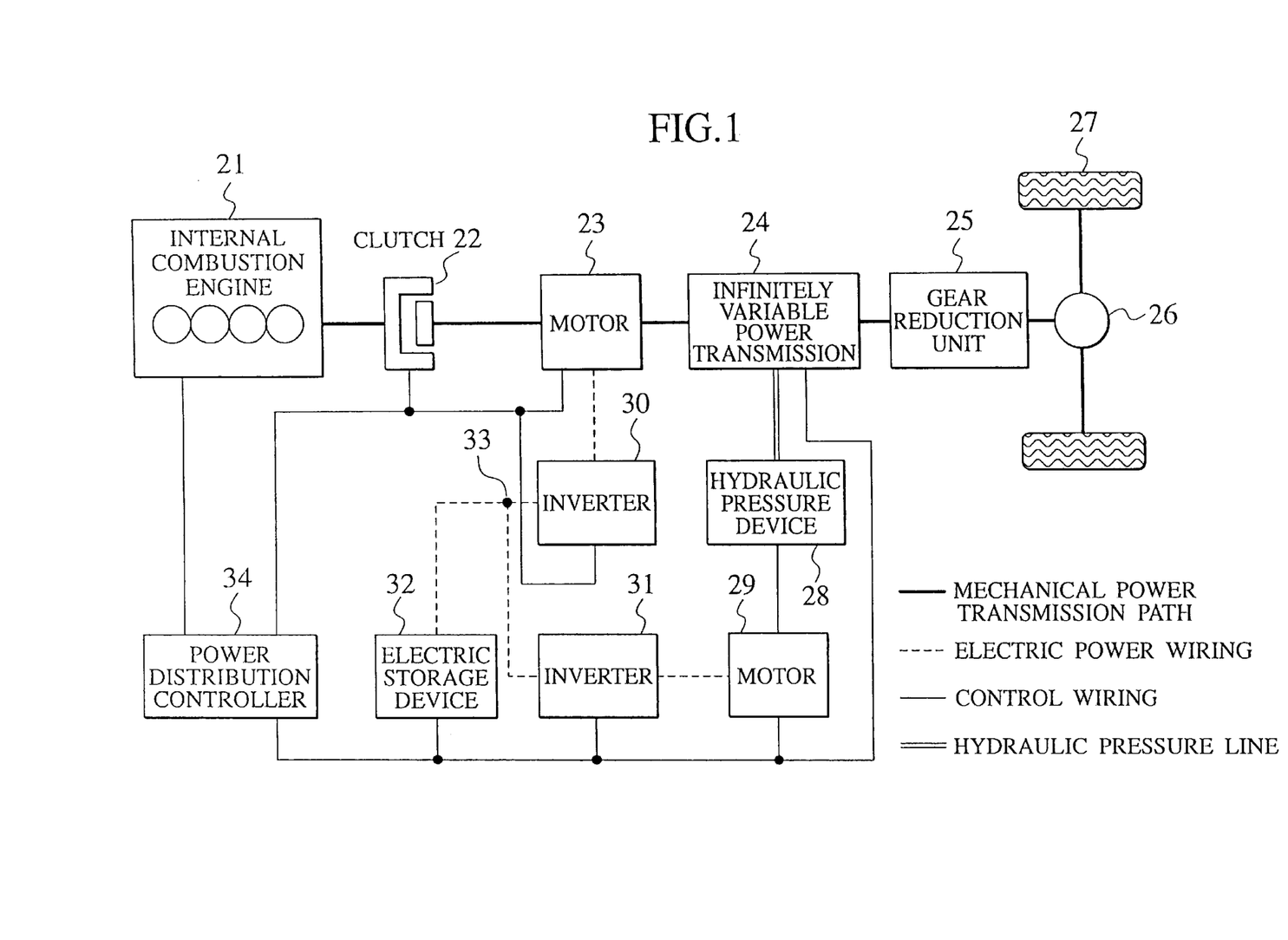
FIG. 1 is a structural view of a control device for a hybrid vehicle involving an infinitely variable power transmission.

An example of a structure, which employs the infinitely variable power transmission, is shown in FIG. 1 in which a hybrid vehicle is structured with an internal combustion engine 21, a clutch 22, a motor 23, the infinitely variable power transmission 24, a gear reduction unit 25, a gear differential 26 and drive wheels 27. With such a vehicle, the presence of the infinitely variable power transmission 24 located for transmitting a drive power output of either one of the internal combustion engine 21 and the motor 23 or drive power outputs of both the engine and the motor to the drive wheels 27 enables an operating point of the internal combustion engine during running of the vehicle to be freely selected from an operating point tracing an equivalent power rate line that satisfies a drive power rate. Such a hybrid vehicle takes an advantage of the freedom of selecting the operating point while an attempt is made to control the operating point of the internal combustion engine to trace an α line for thereby providing an improved fuel consumption.

Figure 2:
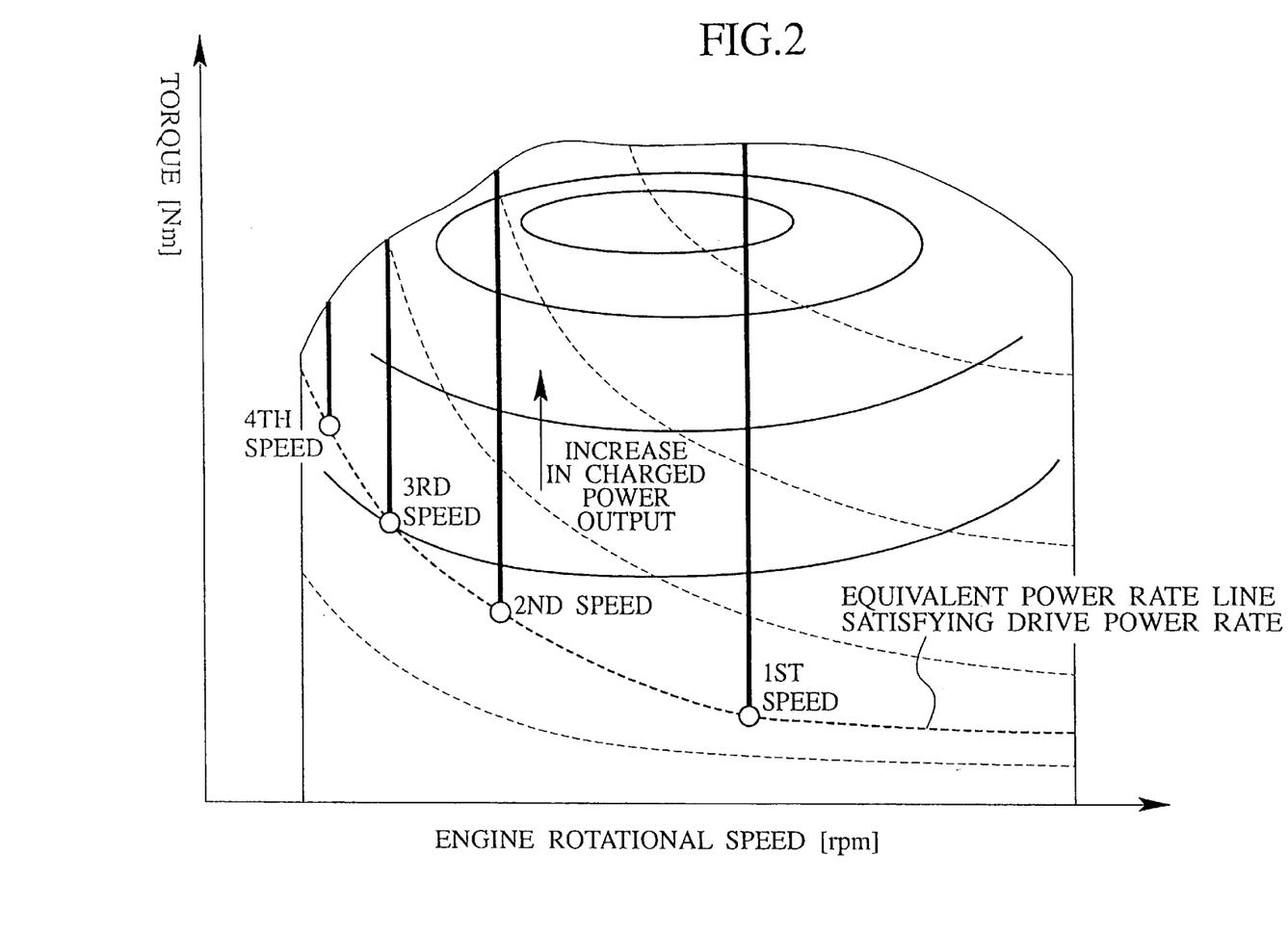
FIG. 2 is a view for illustrating operating points of an internal combustion engine when using a stepped power transmission.

In contrast, with an alternative structure in which the infinitely variable power transmission 24 (inclusive of a hydraulic device 28, a motor 29 and an inverter 31) of FIG. 1 is replaced with the stepped power transmission, since the operating point of the internal combustion engine is determined on the basis of a rotational speed of the internal combustion engine during the running condition, a vehicle speed and respective gear shift stages, the operating point of the internal combustion engine is forced to be selected from an intersecting point between the equivalent power rate line, that satisfies the drive power rate, and the rotational speed that can be taken out for each gear shift stage. FIG. 2 shows the operating points, encircled with ○, of the internal combustion engine and the stepped power transmission that satisfy the drive power rate shown in a dotted line. Also shown by a thin solid line in FIG. 2 is an equivalent running efficiency curve. In order for the improved fuel consumption to be provided with such a vehicle, the gear shift stage comes to be selected such that the operating point of the internal combustion engine becomes the high efficiency, with the freedom in selecting the operating point becoming smaller than that of the infinitely variable power transmission. Further, in an event that the internal combustion engine provides the power rate beyond the drive power rate with an excess of the power rate causing an electric power output to be produced and charged into the electric storage device, since the rotational speed is similarly determined with the vehicle speed and only the resulting torque output is regulated to increase the power rate of the internal combustion engine, the freedom of selecting the operating point becomes small. Thick solid lines in FIG. 2 show the operating points taken out for respective gear shift stages.

SUMMARY OF THE INVENTION

Thus, since no consideration is made for a difference in the operating points of the internal combustion engine in the case of the power transmission composed of the infinity variable type/stepped type structures, an issue arises in that the related art practice can not sufficiently comply with a requirement for selecting the gear shift stage and calculating the unit operating point.

Further, when calculating the unit operating point that forms the target running efficiency, a difficulty is encountered in that the gear shift happens to occur even in the absence of variation in drive power demanded by a driver and the gear shift doe not occur from a high speed gear ratio to a low speed gear ratio or from the low speed gear ratio to the high speed gear ratio, with a resultant situation to give a different feeling touch to the driver.

With the above view in mind, the present invention has an object to provide a control device and control method for a hybrid vehicle in which at least one of drive power outputs of an internal combustion engine and a motor is connected through a stepped power transmission to an output shaft thereof and which enables a target unit operating point, satisfying a target running efficiency, to be realized for effectively eliminating the amount of fuel required for entire running and the amount of exhaust ingredients to be limited.

It is another object of the present invention to provide a control device and control method for a hybrid vehicle in which at least one of drive power outputs of an internal combustion engine and a motor is connected through a stepped power transmission to an output shaft thereof and which is able to alleviate a different feeling touch to be given to a driver due to a variation in a rotational speed of the internal combustion engine during a gear shift.

To achieve the above objects, according to a first aspect of the present invention, there is provided a control device for a hybrid vehicle, including a unit having an internal combustion engine, a motor, a stepped power transmission and an electric storage device adapted to supply electric power output to the motor, wherein at least one of power outputs of the internal combustion engine and the motor is transmitted through the stepped power transmission to an output shaft thereof, the control device comprising a state of charge detecting section detecting an SOC value indicative of a remaining charged capacity of the electric storage device, a target running efficiency calculating section calculating a target value of a running efficiency, indicative of a proportion of a given physical quantity, in terms of a drive power rate required for driving the vehicle, in such a manner that the higher the SOC value, the small will be the target value to be calculated, a target unit operating point calculating section calculating a target value of a unit operating point, that forms the target running efficiency, from among operating points of the unit which cause the drive power rate provided by the internal combustion engine to be utilized at the running efficiency with the maximum efficiency, and a target unit operating point actualizing section controlling the unit such that the unit is operated at the target unit operating point.

According the first aspect of the present invention, since the control device controls the hybrid vehicle, including the unit having the internal combustion engine, the motor, the stepped power transmission and the electric storage device adapted to supply electric power output to the motor, with the at least one of the power outputs of the internal combustion engine and the motor being transmitted through the stepped power transmission to the output shaft thereof using the state of charge detecting section detecting the SOC value indicative of the remaining charged capacity of the electric storage device, the target running efficiency calculating section calculating the target value of the running efficiency, indicative of the proportion of the given physical quantity, in terms of the drive power rate required for driving the vehicle, in such a manner that the higher the SOC value, the small will be the target value to be calculated, the target unit operating point calculating section calculating the target value of the unit operating point, that forms the target running efficiency, from among operating points of the unit which cause the drive power rate provided by the internal combustion engine to be utilized at the running efficiency with the maximum efficiency, and the target unit operating point actualizing section controlling the unit such that the unit is operated at the target unit operating point, it is possible to optimize the proportion of the physical quantity in terms of the drive power rate required for driving the vehicle.

Thus, the present invention concerns an important advantage of a capability for controlling the hybrid vehicle at the highest unit operating point to satisfies the target running efficiency, resulting in an improvement over the running efficiency. This causes the amount of fuel consumption required for an entire running stroke of the vehicle to be effectively decreased.

Another advantage resides in that due to the capability of controlling the hybrid vehicle at the highest unit operating point, the internal combustion engine is enabled to operate at the highest efficiency throughout a whole running state of the vehicle while remarkably eliminating emission of harmful compounds such as CO, HC and Nox.

The present invention further concerns an important advantage of a capability of activating the unit, inclusive of the internal combustion engine, the motor and the stepped power transmission, at the target running efficiency which varies such that the larger the SOC value, the smaller will be the target running efficiency whereby excessive charging or discharging of the electric storage device can be alleviated to preclude the same from being seriously deteriorated.

According to a second aspect of the present invention, there is provided a control method for a hybrid vehicle, including a unit having an internal combustion engine, a motor, a stepped power transmission and an electric storage device adapted to supply electric power output to the motor, wherein at least one of power outputs of the internal combustion engine and the motor is transmitted through the stepped power transmission to an output shaft thereof, the control method comprising detecting an SOC value indicative of a remaining charged capacity of the electric storage device, calculating a target value of a running efficiency, indicative of a proportion of a given physical quantity in terms of a drive power rate required for driving the vehicle in such a manner that the higher the SOC value, the small will be the target value to be calculated, calculating a target value of a unit operating point, that forms the target running efficiency, from among operating points of the unit which cause a power rate provided by the internal combustion engine to be utilized at the running efficiency with the maximum efficiency, and controlling the unit in a way to actualize operation of the unit at the target unit operating point.

DETAILED DESCRIPTION OF THE PREFERRED EMBODIMENTS

Now, an embodiment according to the present invention will be described below with reference to the drawings.

Figure 3:
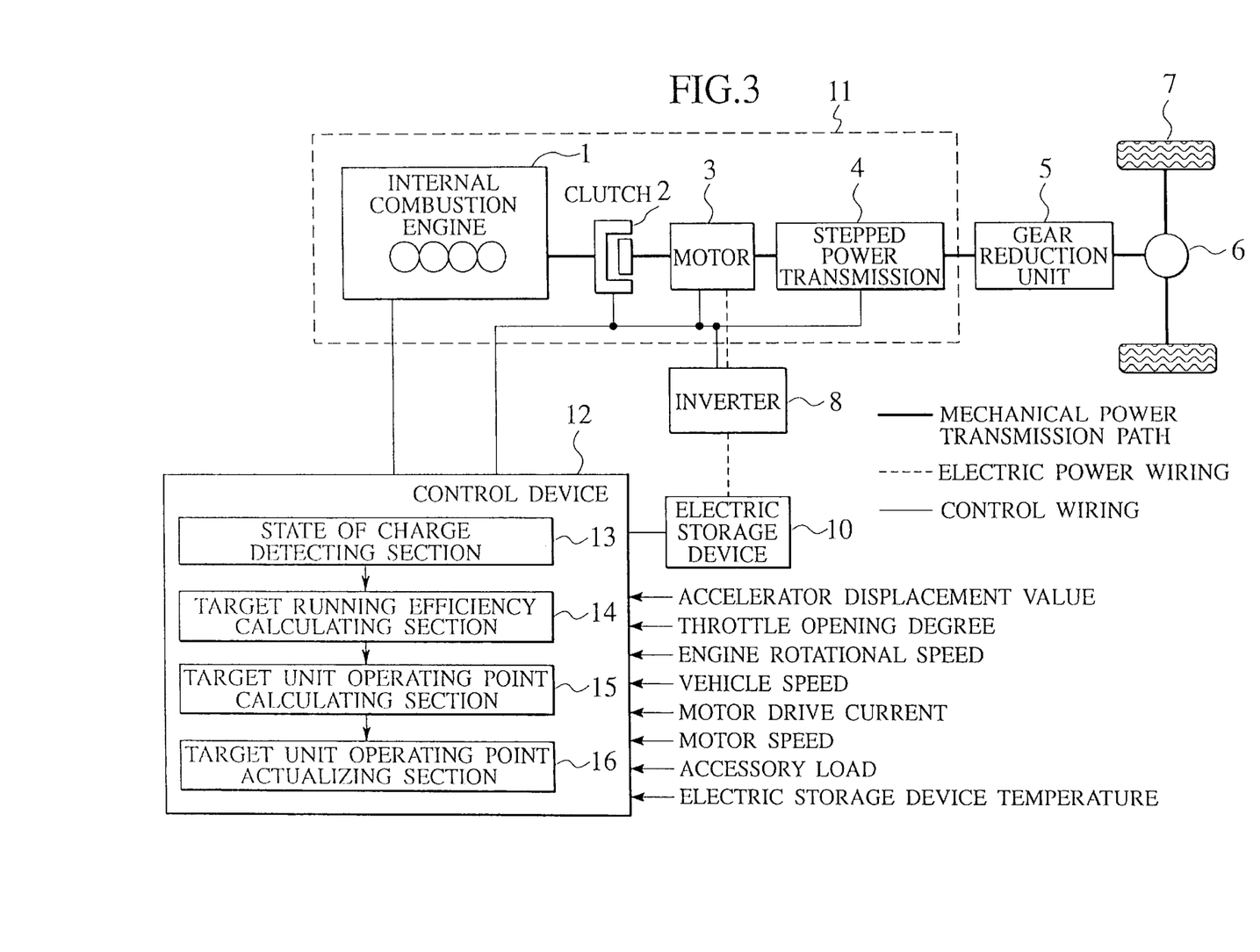
FIG. 3 is a structural view of an embodiment of the control device for the hybrid vehicle according the present invention.

FIG. 3 is a system structural view for illustrating a structure of an embodiment of a control device for a hybrid vehicle according to he present invention in compliance with the invention defined in claim 1. In FIG. 3, a thick solid line designates a power transmission path, a dotted line designates an electric power line, and a thin solid line designates a control wiring.

The presently filed embodiment is explained in conjunction with a vehicle including a power train structured with an internal combustion engine 1, a clutch 2, a motor 3, a stepped power transmission 4, a gear reduction unit 5, a differential unit 6 and drive wheels 7. An output shaft of the internal combustion engine 1 is connected to an input shaft of the clutch 2, an output shaft of the clutch 2 is connected to an input of the motor 3, and an output shaft of the motor 3 is connected to an input shaft of the stepped power transmission 4.

The internal combustion engine 1, the clutch 2, the motor 3 and the stepped power transmission 4 are conveniently referred to as a drive power unit 11 hereinafter, of which operative point is controlled with the control device of the hybrid vehicle (simply referred to as the control device hereinafter).

The clutch 2 is controlled for engagement/disengagement with the control device 12, and during engagement of the clutch 2, both the internal combustion engine 1 and the motor 3 form a propulsion source of the vehicle whereas during disengagement of the clutch 2, only the motor 3 forms the propulsion source. The motor 3 is driven with an inverter 8.

The inverter 8 is connected to an electric storage device 10 and operative to convert an alternating power output, generated by the motor 3 during a regenerative mode, to a direct power output which is charged into the electric storage device 10 while during a propelling mode, converting the direct power output of the electric storage unit device to the alternating power output which is supplied to the motor 3 in response to a torque command delivered from the control device 12 to provide an assisted drive power. The electric storage device 10 may be structured with a variety of batteries such as a lithium ion battery, a nickel hydrogen battery and a lead battery or a so-called capacitor such as an electric double layered capacitor.

While, in the presently filed embodiment, the stepped power transmission 4 is described below as including a four speed power transmission, the present invention similarly has an advantage even in a case where the other type of stepped power transmission is utilized.

The control device 12 is applied with a physical quantity, delivered from sensors which are not shown, indicative of a vehicle status such as an accelerator displacement value, a throttle opening degree, an engine speed, a vehicle speed, a motor drive current, a motor speed, an accessory load and a temperature of the electric storage device, or a converted quantity corresponding to the physical quantity. Also, the control device 12 is responsive to these inputs and produces command signals to be delivered to the internal combustion engine 1, the clutch 2, the motor 3, the stepped power transmission 4 and the inverter 8.

The control device 12 is comprised of a state of charge detecting unit 13 which detects a state of charge (SOC) of the electric storage device 10 indicative of a remaining charged capacity thereof, a target running efficiency calculation unit 14 which serves as a means for calculating a target value of a running efficiency, which forms a rate of a given physical quantity in terms of a drive power rate required for driving the vehicle, such that the larger the SOC detected value, the smaller will be the target value, a target unit operating point calculation unit 15 which calculates a target value of a unit operating point, that forms the target running efficiency set forth above, on the basis of operating points of the drive power unit 11 in which the power rate generated by the internal combustion engine 1 is adjusted at the highest running efficiency, and a target operating point actualizing device 16 which controls such that the drive power unit 11 operates at the target unit operating point previously mentioned.

Here, the operating point of the drive power unit 11 which the control device 12 controls is represented with a target engine torque tNe[Nm] which is to be generated by the internal combustion engine 1, a target motor torque tTm [Nm], a target gear shift stage tG representing a gear shift stage which the stepped power transmission 4 enables a gear shift, and a clutch engagement flag Fc indicative of either one of engagement/disengagement of the clutch 2.

In the presently filed embodiment, though not intended to limit the invention to a particular configuration, the control device 12 is realized using software control of a microcomputer.

Now, an overall control flow of the control device 12 is described below with reference to a schematic flow chart of FIG. 4. In the following description, the running efficiency is defined in terms of the drive power rate required for drive of the vehicle and assigned to be a proportion of the amount of fuel to be consumed for providing such a drive power rate, and a unit of the running efficiency is assigned as [cc/j] (claim 2). Also, [*] designates a multiplication symbol.

First, in step S401, the operation is executed to detect signals, indicative of the vehicle status, such as the accelerator pedal displacement value θ [deg] and the vehicle speed vsp[km/h].

In step S402, the drive power rate tPd[W] required by a driver is calculated from the accelerator pedal displacement value θ [deg] and the vehicle speed vsp[km/h].

In step S403, the operation is executed to calculate the running efficiency Vn that enables the power rate of the internal combustion engine to satisfy the drive power rate tPD[W] with no excess and shortage.

In step S404, the SOC is detected. More specifically, the SOC detected value [%] is detected by obtaining the electric power output, which is delivered to or from the electric storage device, from a voltage occasionally appearing at terminals and by integrating the voltage with time. The SOC detected value [%] is assigned such that a full charged state of the electric storage unit 10 is represented with 100 [%].

In step S405, the target running efficiency is calculated on the basis of the SOC detected value.

In step S406, the operation is executed to calculate the operating point of the power drive unit 11 (the internal combustion engine 1, the clutch 2, the motor 3 and the stepped power transmission 4) that actualizes a determined operating mode.

In step S407, the power drive unit 11 is controlled so as to realize the calculated operating point.

Details of the above steps are described below with reference to a detailed flow chart of FIGS. 5 to 11.

Figure 4:
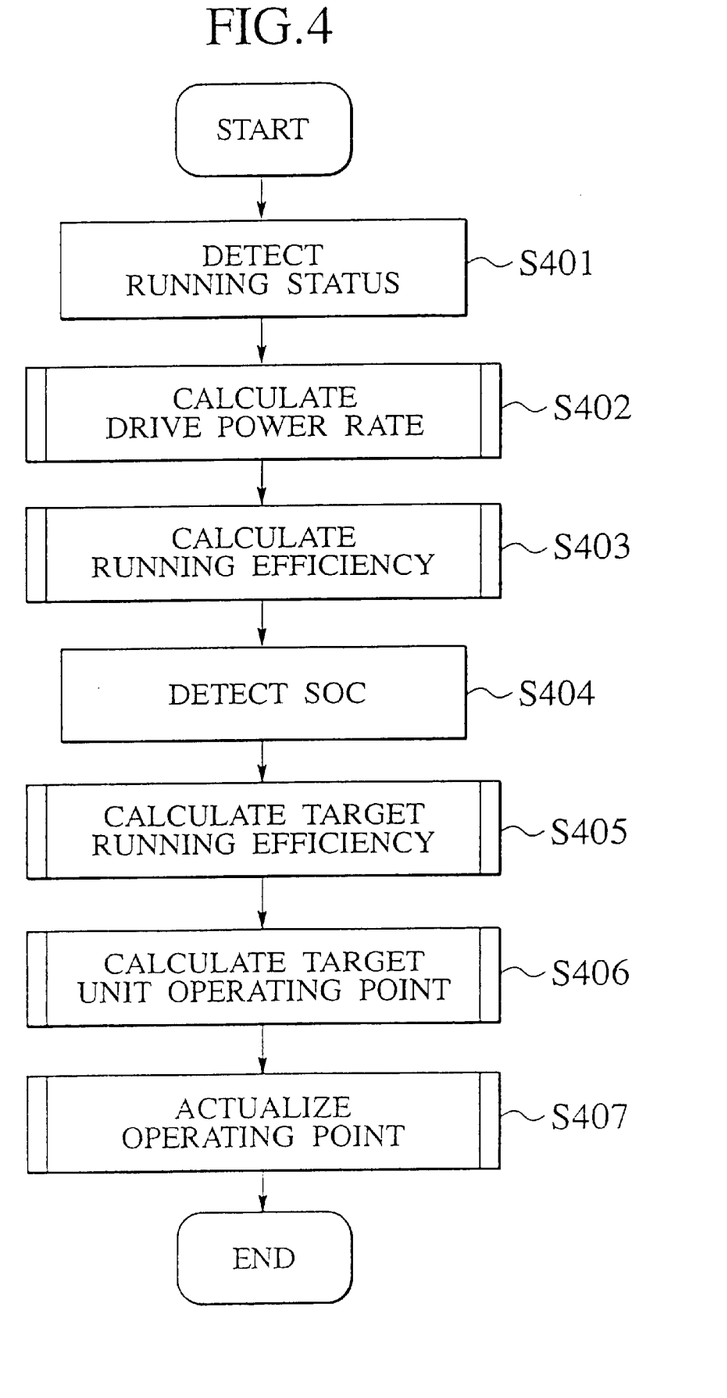
FIG. 4 is a schematic flowchart for illustrating a brief operation of the embodiment.
Figure 5:
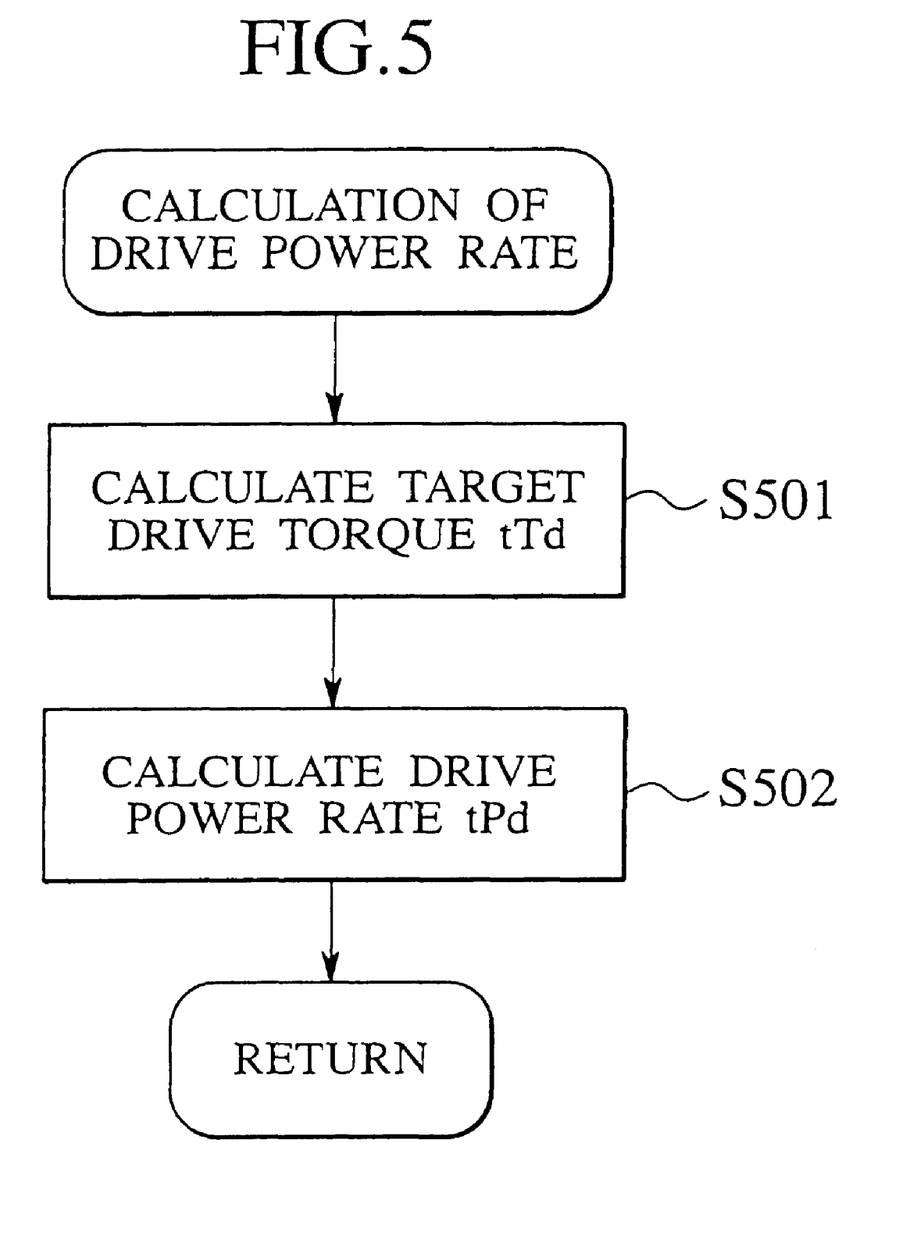
FIG. 5 is a detailed flowchart of the embodiment.

FIG. 5 is a detailed flow chart illustrating a detailed operation of step S402 for calculating the drive power rate of FIG. 4.

Figure 12:
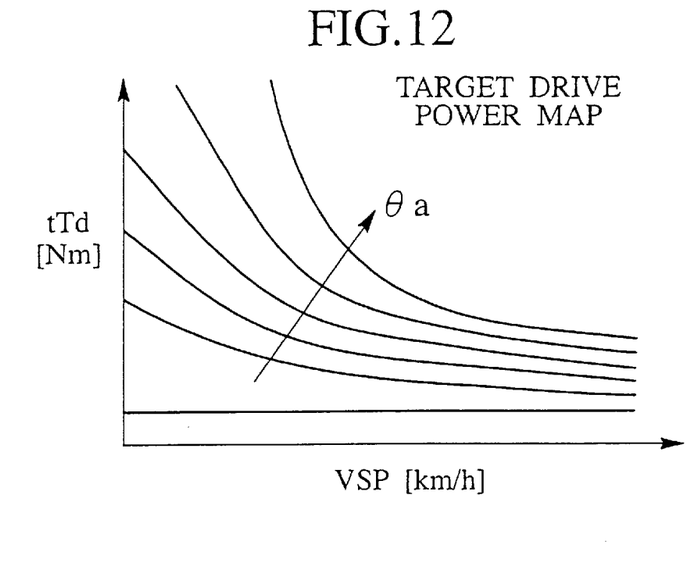
FIG. 12 is an example of a map table for use in the embodiment.

In step S501, operation is executed to calculate the target drive torque tTD[Nm] by retrieving a map of MAPttd (vsp, θ) on the basis of the vehicle speed vsp[km/h] and the accelerator pedal displacement value θ [deg]. The target drive torque tTD[Nm] represents a target value of an output toque of the stepped power transmission 4. FIG. 12 shows an example of MAPttd(vsp, θ of the target drive torque.

In step S502, the drive power rate tPd[W] is calculated using a formula (1) on the basis of the target drive torque tTD[Nm] and the vehicle speed vsp[km/h]. Also, a symbol r in the formula (1) designates a tire's effective radius[m], and a symbol Gf represents a gear reduction ratio of the gear reduction unit 5.

$$tPd = \frac{tTd}{Gf} * \frac{vsp*10}{36} * \frac{1}{Gf*G(i)} \quad (1)$$

Here, the drive power rate tPd[W] may includes a value added with a power rate required for operating accessory units. In such a case, the running efficiency, which is calculated in step S403 (see FIG. 4), is an actual value which reflects the electric power consumption of the accessory units, resulting in a further decrease in the running efficiency.

Figure 6:
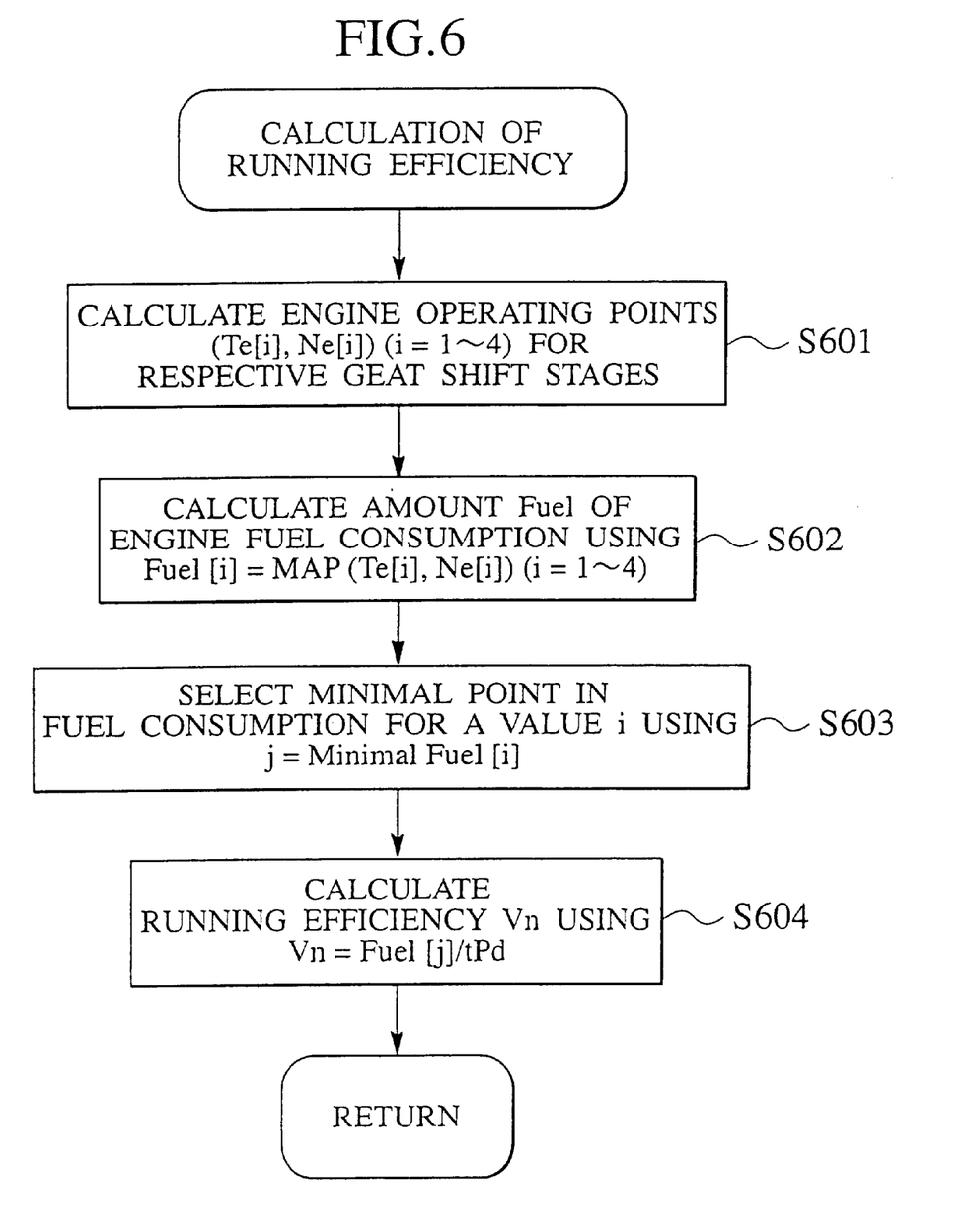
FIG. 6 is a detailed flowchart of the embodiment.

Next, a detailed operation of step S403 for calculating the running efficiency shown in FIG. 4 is illustrated in a detailed flow chart of FIG. 6.

In step S601, the operation is executed to calculate the torque Te(i)[Nm], that is the operating point of the internal combustion engine which satisfies the target drive power rate tPd[W], and the rotational speed Ne(i)[rad/s](I=1~n) using a formula (2) and a formula (3), respectively. Here, the torque Te(i)[Nm] and the rotational speed Ne(i)[rad/s] represent the torque and the rotational speed, respectively, appearing when the clutch 2 is held in engagement either with no provision of the assisted drive from the motor 3 or with no regenerative power generation of the motor 3. Also, a symbol i designates a gear stage of the stepped power transmission, a symbol G(i) designates a reduction ratio of the gear stage i, and a symbol n designates a value (in the presently filed embodiment, n=4) of the highest gear stage.

$$Ne(i) = \frac{vsp*10}{36} * \frac{1}{r} * \frac{1}{Gf*G(i)} \quad (2)$$

$$Te(i)=tTd*G(i) \quad (3)$$

Figure 13:
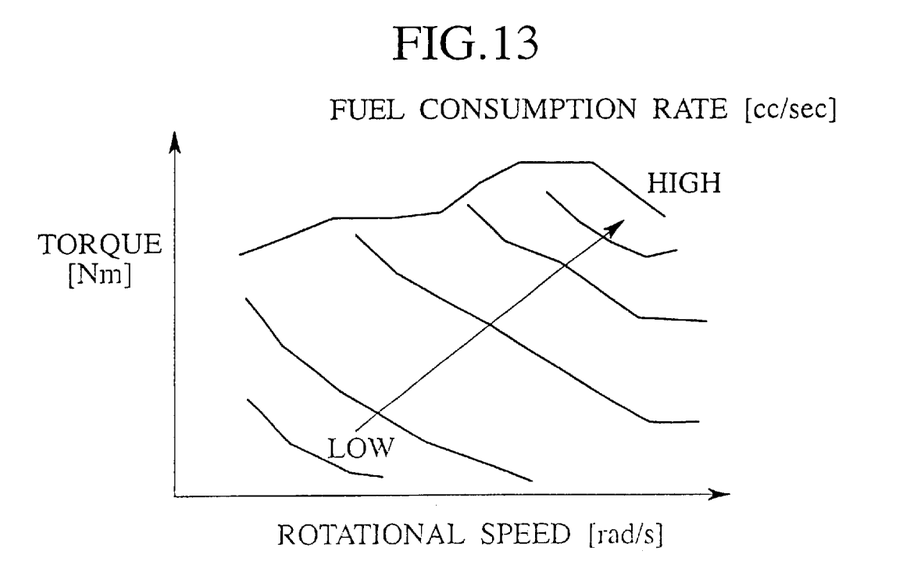
FIG. 13 is an example of a map table for use in the embodiment.

In step S602, the operation is executed to calculate the fuel consumption rate Fuel(i)[cc/s] of the internal combustion engine in case of using various gear reduction stages by retrieving the map of MAPfuel Te(i), Ne(i))(i=1~n). FIG. 13 shows an example of the map MAPfuel of fuel consumption rate calculation result of the internal combustion engine. A value of this map represents the fuel consumption rate obtained through preliminary experimental tests.

In step S603, the operation is executed to select the smallest value of i among all the fuel consumption rates Fuel(i) of the internal combustion engine, with i being assigned as J.

In step S604, the operation is executed to calculate the running efficiency Vn[cc/J], in a formula (4), to meet the drive power rate tPd[W] using the internal combustion engine.

$$Vn=\text{Fuel}(j)/tPd \quad (4)$$

Figure 7:
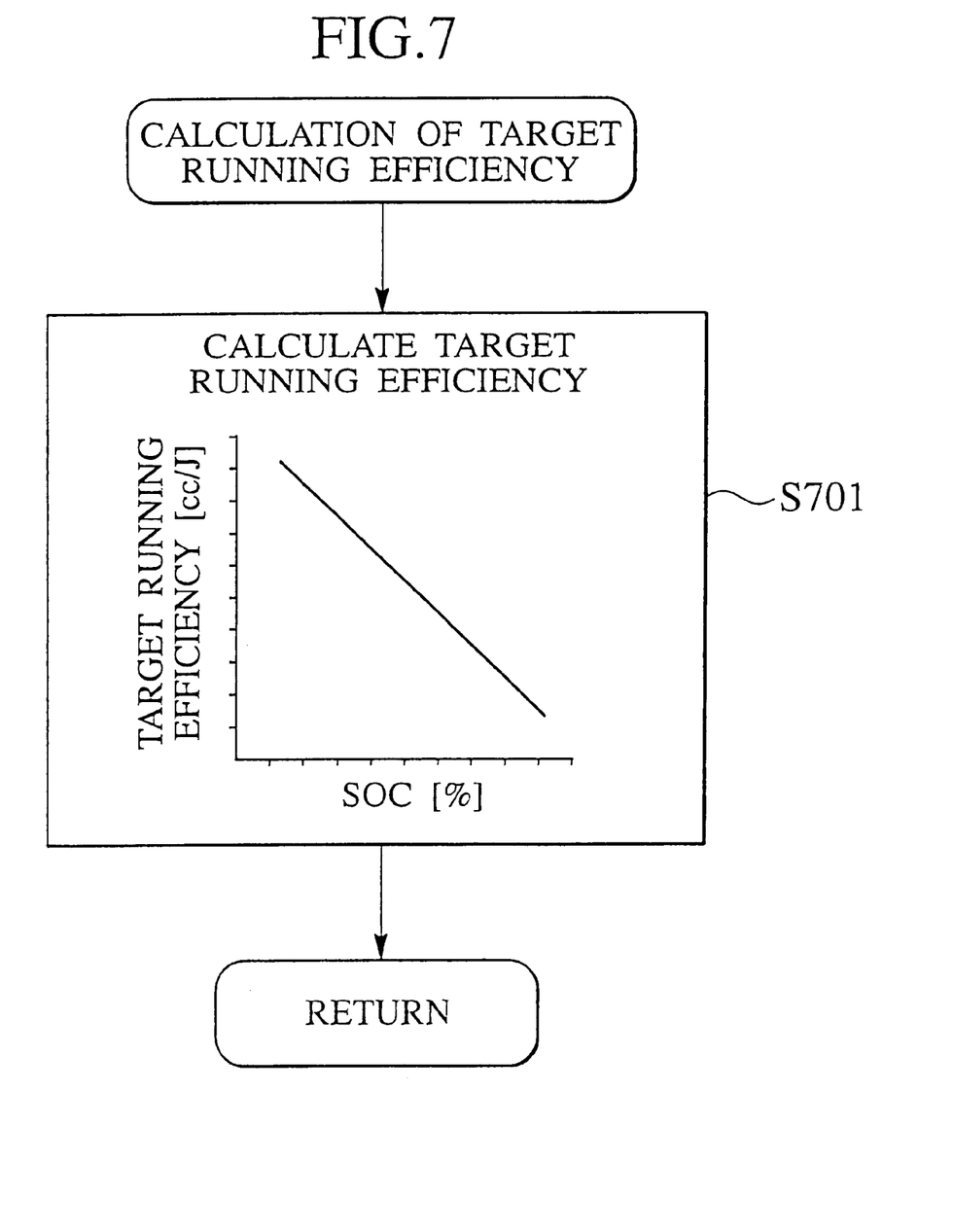
FIG. 7 is a detailed flowchart of the embodiment.

Subsequently, a detailed operation of step S405 for determining the target running efficiency of FIG. 4 is described below with reference to a detailed flow chart of FIG. 7.

In step S701, retrieving a table of TABLEtvd(SOC) allows the target running efficiency tVd[cc/s] to be calculated based on the SOC detected value of SOC[%]. The TABLEtvd(SOC) is determined to have the running efficiency with the maximum value, which the internal combustion engine is able to provide, at an upper limit value (for instance, SOC=80[%]) of an SCO available range, and determined to have the running efficiency with the maximum value in a range of the running efficiency in which discharging of the power output is disenabled at all times without relying on the running condition at a low limit value (for instance, SOC=30[%]).

Here, the running efficiencies, that correspond to the upper and lower limit values of the SOC available range, may be determined by obtaining the running efficiencies in terms of all possible combinations between the drive power rate tPd and the power rate of the internal combustion engine which can be undertaken. Further, in a range beyond the upper and lower limits of the SOC available range, the target running efficiencies in terms of all the SOC values may be determined by implementing a linear complimenting based on correlated values.

Figure 8:
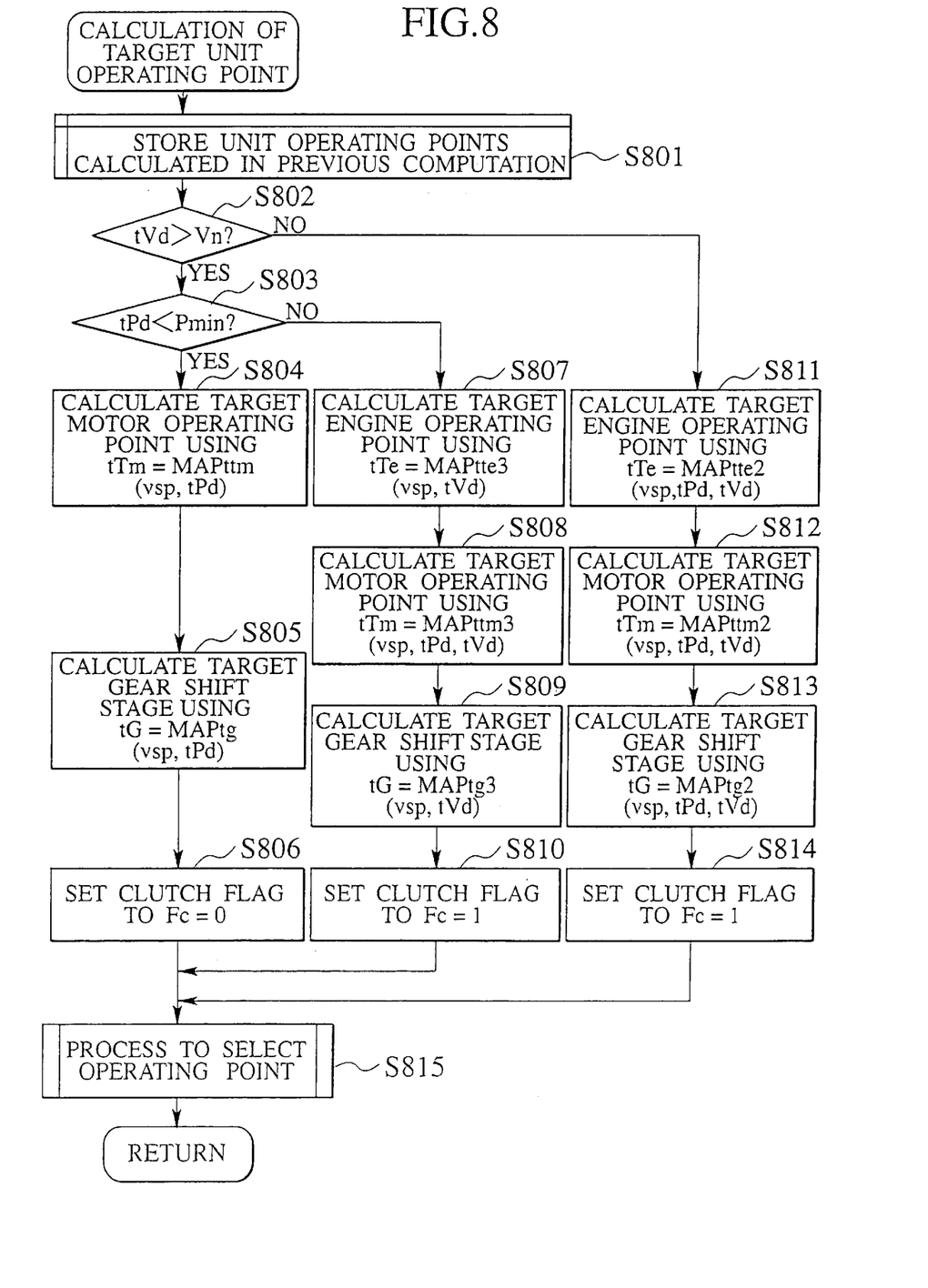
FIG. 8 is a detailed flowchart of the embodiment.

Next, the operation of step S406 for calculating the drive power unit operating point that satisfies the target running efficiency of FIG. 4 is described in detail using a flow chart of FIG. 8.

In step S801, the operation is executed to store the target engine torque tNe[Nm], the target motor torque ttm[Nm], the target gear shift stage tG and the clutch engagement flag Fc, which form the drive power unit operating points calculated in the previous computation.

In step S802, the operation is executed to compare a large or small relationship between the running efficiency Vn[cc/J] and the target running efficiency tVd[cc/J].

In step S802, in the case of tVd>Vn, the operation proceeds to step S803 where the operation is executed to compare the large or small relationship between the drive power rate tPd[W] and the power rate Pmin[W] of the internal combustion engine with the running efficiency remaining in a minimal value.

In step S803, in the case of tPd<Pmin, the operation proceeds to steps S804 to S806 where the drive power unit operating points during a motor propelling mode are calculated.

In step S804, retrieving the map of MAPttm(vsp, tPd) allows the target motor torque ttm[Nm] to be calculated on the basis of the vehicle speed vsp[km/h] and the drive power rate tPd[W]. The map of MAPttm(vsp, tPd) is formed, by calculating the motor torque values, satisfying the drive power rate tPd[W] in terms of the vehicle speed vsp[km/h], for respective gear shift stages on the basis of an energy conversion efficiency of the motor, with a value correlated with the motor torque that satisfies the drive power rate tPd[W] with a minimal amount of electric power output.

In step S805, retrieving the map of MAPtg(vsp, tPd) allows the target gear shift stage tG to be calculated on the basis of the vehicle speed vsp[km/h] and the drive power rate tPd[W]. The map of MAPtg(vsp, tPd) is formed with a value correlated with the gear shift stage used when calculating the target motor torque ttm[Nm] using the map of MAPttm(vsp, tPd).

In step S806, the clutch engagement flag is set to a logic level of "0". This is meant that the clutch remains disengaged.

In step S803, in the absence of tPd<Pmin, the operation proceeds to steps S807 to S810 where the operation is executed to calculate the unit operating point during an assist running mode (running status in which the clutch 2 is brought into engagement to allow a combined drive power between the internal combustion engine 1 and the motor 3 to be provided to propel the vehicle).

In step S807, retrieving the map of MAPtte3(vsp, tVd) allows the target engine torque tTe[Nm] to be calculated on the basis of the vehicle speed vsp[km/h] and the target running efficiency tVd[cc/J]. The map of MAPtte3(vsp, tVd) is formed with a value of the unit operating point correlated with the torque output of the internal combustion engine, by which the maximum engine power rate satisfying the target running efficiency tVd[cc/J] is provided, among the unit operating points at which the power rate provided by the internal combustion engine is utilized at the running efficiency with the maximum value.

In step S808, the map of MAPttm3(vsp, tPd, tVd) is formed with a value correlated with the motor torque calculated to compliment the drive power rate tPd[W], on the basis of the vehicle speed vsp[km/h], the target running efficiency tVd[cc/J] and the drive power rate tPd[W], using the operating point of the internal combustion engine calculated in step S807.

In step S809, retrieving the map of MAPtg3 (vsp, tVd) allows the target gear shift stage tG to be calculated on the basis of the vehicle speed vsp[km/h] and the target running efficiency tVd[cc/J]. The map of MAPtg3(vsp, tVd) is formed with a value correlated with the gear shift stage used when calculating the target engine torque tTe[Nm] using the map of MAPtte3(vsp, tVd).

In step S810, the clutch engagement flag is set to a logic level of "1". This is meant that the clutch remains engaged.

In step S802, in the absence of tVd>Vn, the operation proceeds to steps S811 to S814 where the operations are executed to calculate the unit operating points to be used during a direct drive running mode (a running mode in which the drive power rate is provided only with the power rate of the internal combustion engine 1) and a combined drive mode, inclusive of the direct drive running and chargeable running state in combination, (i.e. a running mode in which the internal combustion engine 1 provides the power rate that is in excess of the drive power rate, with the excess drive power being utilized to drive the motor 3 as the electric power generator to produce the electric power output which is converted to the direct current power output to be charged to the electric storage device 10).

In step S811, retrieving the map of MAPtte2(vsp, tPd, tVd) allows the target engine torque tTe[Nm] to be calculated on the basis of the vehicle speed vsp[km/h], the target running efficiency tVd[cc/J] and the drive power rate tPd [W]. The map of MAtte2(vsp, tPd, tVd) is formed with a value of the the operating point correlated with the torque output of the internal combustion engine, by which the maximum engine power rate satisfying the target running efficiency tVd[cc/J] is provided, among the unit operating points at which the power rate provided by the internal combustion engine is utilized at the running efficiency with the maximum value.

In step S812, retrieving the map of MAPttm2(vsp, tPd, tVd) allows the target motor torque tTm[Nm] to be calculated on the basis of the vehicle speed vsp[km/h], the target running efficiency tVd[cc/J] and the drive power rate tPd [W]. The map of MAPttm2(vsp, tPd, tVd) is formed with a value of the operating point correlated with the output torque of the motor among the unit operating points when calculating the map of MAPtte2(vsp, tPd, tVd) used in step S811.

In step S813, retrieving the map of MAPtg2(vsp, tPd, tVd) allows the target gear shift stage tG to be calculated on the basis of the vehicle speed vsp[km/h], the target running efficiency tVd[cc/J] and the drive power rate tPd[W]. The map of MAPtg2(vsp, tPd, tVd) is formed with a value correlated with the gear shift stage among the unit operating point when calculating the map of MAPtte2(vsp, tPd, tVd) used in step S811.

In step S814, the clutch engagement flag Fc is set to a logic level of "1" (in the engaged state).

In subsequent step S815, the operation for selection of the operating points is executed, thereby completing the operation for the calculation of the target unit operating point, and the operation returns to the initial step. The operating point selecting operation is implemented to address an occurrence of a different feeling touch to be given to the driver when used the target value of the unit operating points calculated in the control flows so far. This operation is described below.

Figure 9:
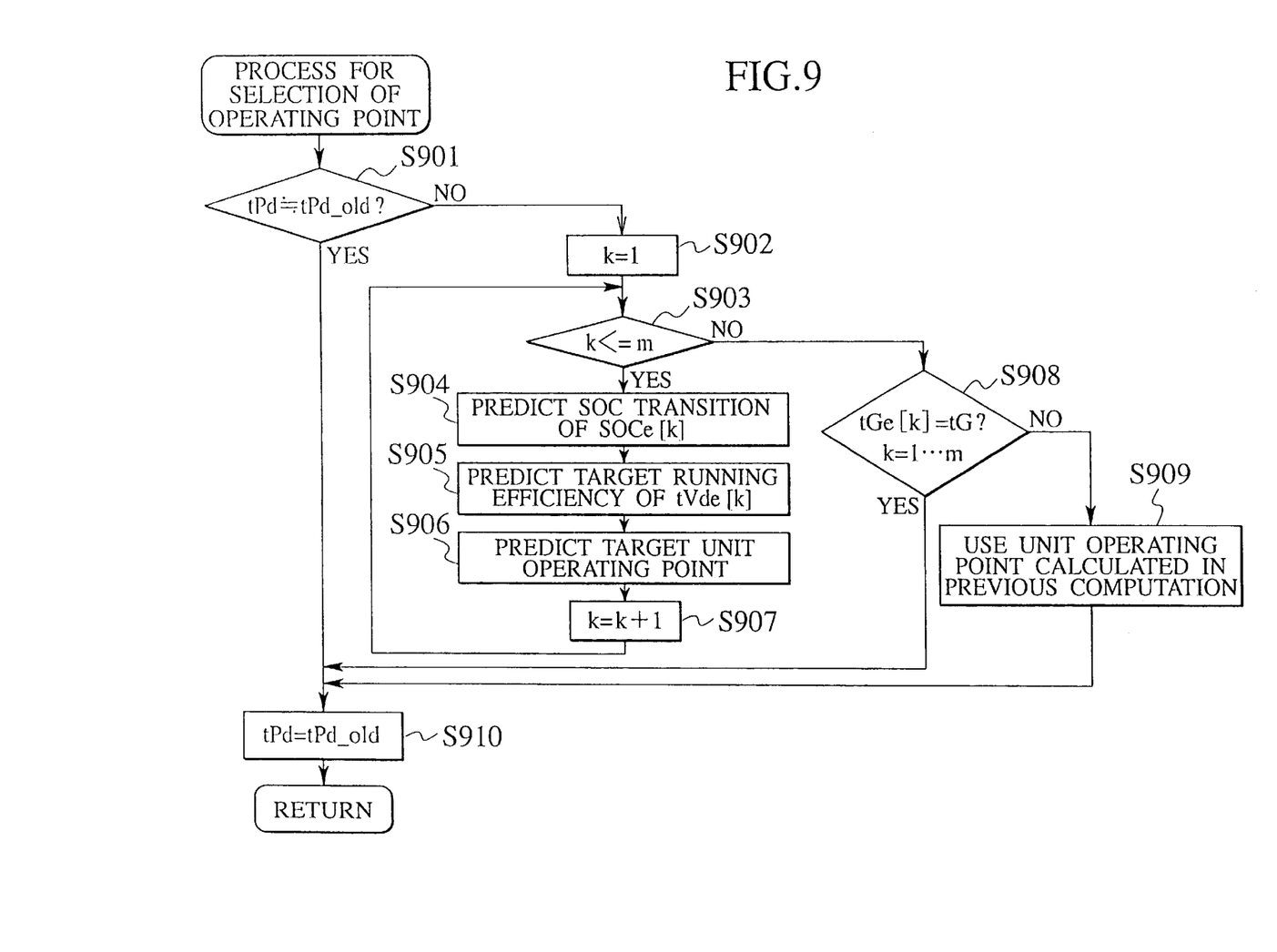
FIG. 9 is a detailed flowchart of the embodiment.

A detail of the operating point selecting operation, that is defined in claims 5, 6, is described with reference to a flow chart of FIG. 9.

In step S901, the operation is executed to make comparison between the drive power rate tPd_old[W] appearing in a previous calculation period and the drive power rate tPd[W] appearing in the current calculation period.

In step S901, if it is discriminated that tPd_old≈tPd, the operation proceeds to step S910.

In step S902, if it is not discriminated that tPd_old≈tPd, a variable is set to a logic level of "1". This variable "1" represents that a future prediction of the target unit operating point is implemented after an elapse of k seconds from the current time.

In step S903, the operation is executed to make comparison for a large or small relationship between the variable k and a constant m indicative of a given time interval. This constant in represents that the prediction of the target unit operating point is implemented after an elapse of a time interval of k seconds from the current time. For instance, when setting the constant m to m=10, the target unit operating point comes to be predicted for 10 seconds.

In step S902, in the case of k≦m, the operation proceeds to step S904 in which an SOC transition of SOCe[k] after k seconds is predicted. The SOCe[k] is calculated in the following formula (5).

$$SOCe[k]=SOC[k-1]+tCb/BATCAP*100 \qquad (5)$$

wherein tCb[J] represents the target charging and discharging rate and BATCAP[J] represents a battery capacity. Also, the target charging and discharging rate tCb[J] can be expressed in the following formula (6).

Also, effBat represents a battery charging efficiency.

$$tCb = \int [(tTe*Ne - tPd)*effBat]dt \qquad (6)$$

$$= \int \left[\left(tTe*\frac{vsp*10}{36}*\frac{1}{r}*\frac{1}{Gf*G(tG)} - tPd\right)*effBat\right]dt$$

In succeeding step S905, the operation is executed to predict the target running efficiency of tVde[cc/J] appearing from the current time until k seconds. This prediction is performed by retrieving the table of SOCe[k] utilizing, the table of TABLEtvd(SOC) used in step S40t (see FIG. 4) for calculating the target running efficiency.

In step S906, the unit operating point satisfying the target running efficiency of tVde[cc/J] is predicted. In this step, the operation is executed in the same manner as those of flow charts in steps S801 to 814 of FIG. 8.

In step S907, the variable k is increased by a value of 1, with the operation being branched to step S903.

In the absence of k≦m in step S903, the operation proceeds to step S908 in which discrimination is made as to whether the target gear shift stage tGe[k] (k=1 ... m) until m seconds is equal to the target gear shift stage tG.

In step S908, if it is discriminated that the target gear shift stage tGe[k] (k=1 ... m) until m seconds is equal to the target gear shift stage tG, the operation proceeds to step S910.

In step S908, if it is discriminated that the target gear shift stage tGe[k] (k=1 ... m) until m seconds is not equal to the target gear shift stage tG, the operation proceeds to step S909 in which the target unit operating point is assigned to the unit operating point calculated in the previous computation.

In step S910, the drive power rate tPd[W] is assigned to the drive power rate tpd_old[W] appearing in the previous computation.

Figure 10:
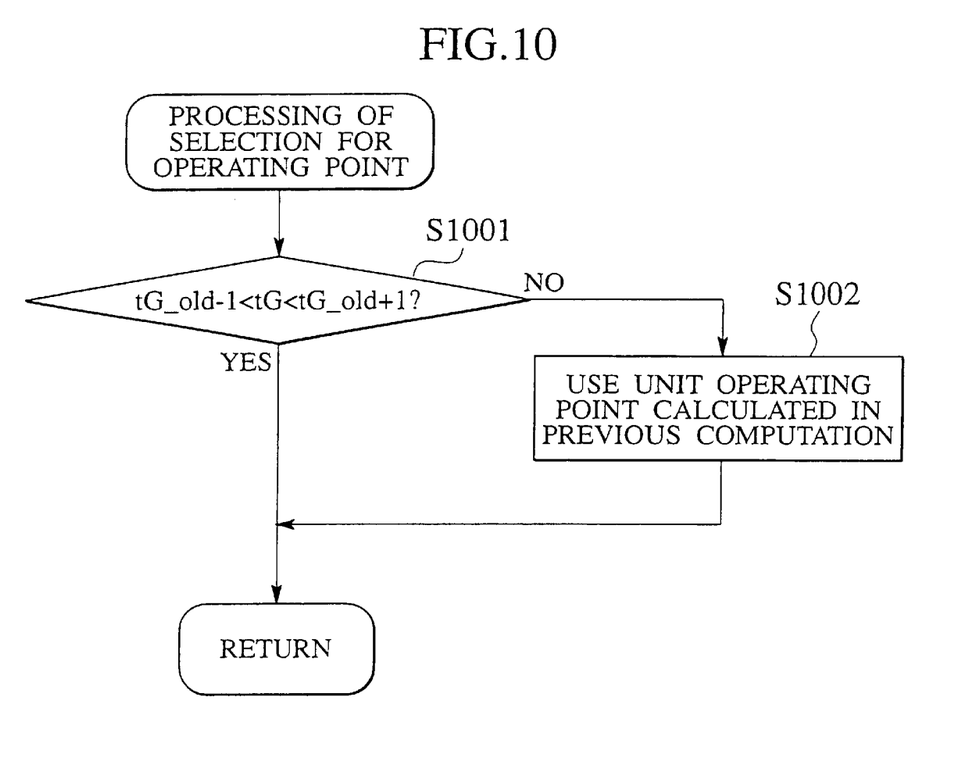
FIG. 10 is a detailed flowchart of the embodiment.

Next, a detail of the operating point selecting operation, defined in claim 7, is described below with reference to a flow chart of FIG. 10.

In step S1001, the operation is executed to make comparison between the target gear shift stage tG_old in the previous computing period and the target gear shift stage tG in the current computing period. Here, discrimination is made as to whether tG is changed relative to tG_old, i.e. whether the gear shift occurs from a high speed gear ratio to a low speed gear ratio or from the low speed gear ratio to the high speed gear ratio.

In step S1001, when it is discriminated that tG is changed relative to tG_old, i.e. when the gear shift occurs from the high speed gear ratio to the low speed gear ratio or from the low speed gear ratio to the high speed gear ratio in a sequence, the operation is terminated.

In step S1001, when it is discriminated that tG is not changed relative to tG_old, i.e. when the gear shift does not occur from the high speed gear ratio to the low speed gear ratio or from the low speed gear ratio to the high speed gear ratio in the sequence, the operation proceeds to step S1002 where the target unit operating point is assigned to the unit operating point that is calculated in the previous computation.

Figure 11:
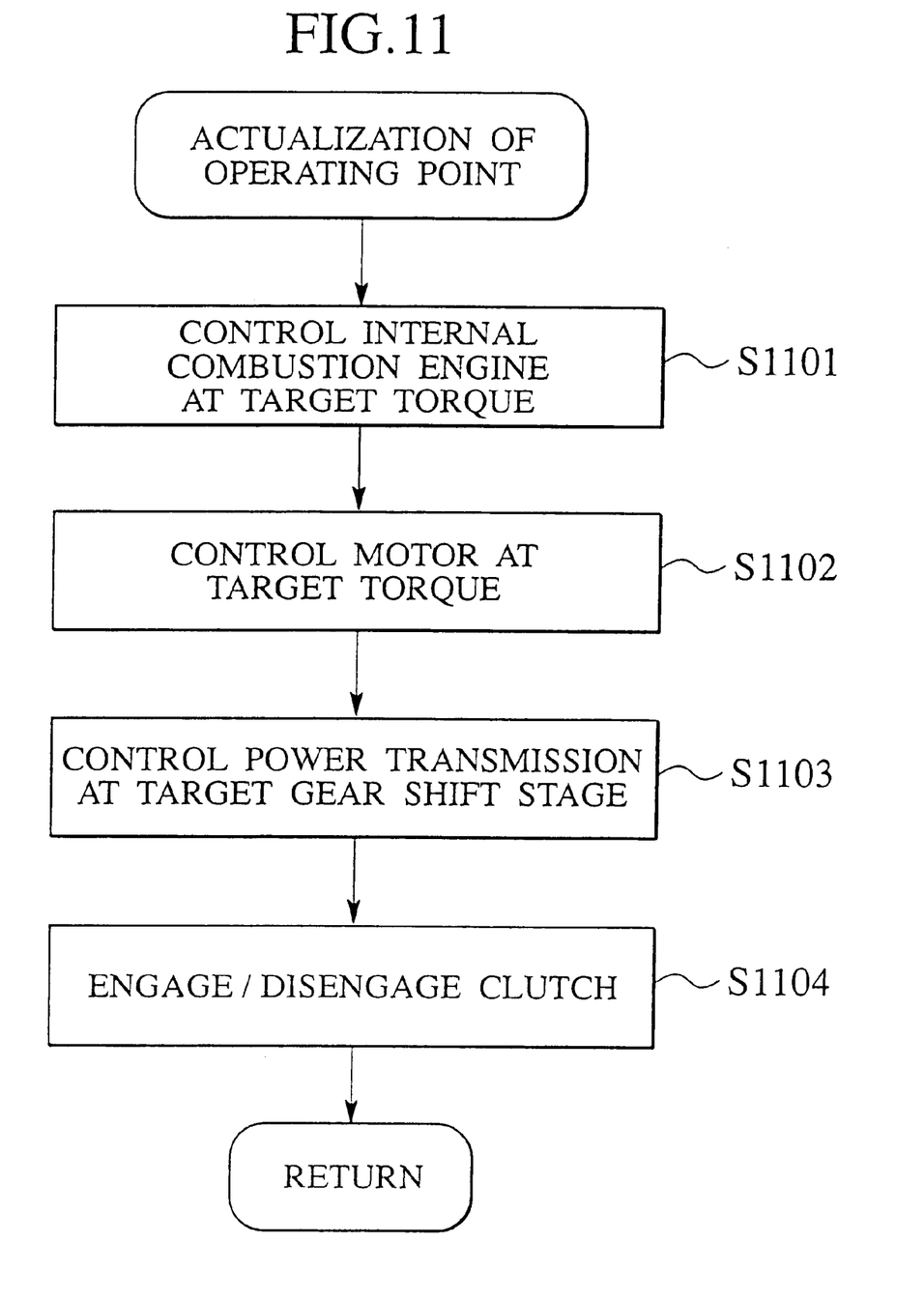
FIG. 11 is a detailed flowchart of the embodiment.

Next, a detail of operations in step S407 to realize the target unit operating point of FIG. 4 is described below with reference to a flow chart of FIG. 11.

In step S1101, the amount of fuel injection, the throttle opening degree and the ignition timing are regulated to cause the internal combustion engine 1 to produce the output torque that is equal to the target engine torque tTe[Nm].

In step S1102, the motor 3 is vector controlled to produce the output torque that is equal to the target motor torque tTm[Nm]. In step S1103, the gear shift stage of the stepped power transmission 4 is shifted to the target gear shift stage tG. In step S1104, the clutch 2 is controlled for engagement or disengagement in dependence on the preset value of the clutch engagement flag Fc.

As an example for realizing claim 3, the operation may be executed along with the flow chart of FIG. 4 by replacing the running efficiency with a proportion of a mass of ingredients, in terms of the drive power rate required for driving the vehicle, exhausted by the engine in order to provide such drive power rate while the ingredients are limited from being exhausted.

What is claimed is:

1. A control device for a hybrid vehicle, including a unit having an internal combustion engine, a motor, a stepped power transmission and an electric storage device adapted to supply electric power output to the motor, wherein at least one of power outputs of the internal combustion engine and the motor is transmitted through the stepped power transmission to an output shaft thereof, the control device comprising:
   a state of charge (SOC) detecting section detecting an SOC value indicative of a remaining charged capacity of an electric storage device;
   a target running efficiency calculating section calculating a target value of a running efficiency, indicative of a proportion of a given physical quantity, in terms of a drive power rate required for driving the vehicle, in such a manner that the higher the SOC value, the smaller will be the target value to be calculated;
   a target unit operating point calculating section calculating a target value of a unit operating point, that forms the target running efficiency, from among operating points of a unit which cause the drive power rate provided by an internal combustion engine to be utilized at the running efficiency with the maximum efficiency; and
   a target unit operating point actualizing section controlling the unit such that the unit is operated at the target unit operating point.

2. The control device for the hybrid vehicle according to claim 1, wherein the running efficiency is a proportion of the amount of fuel, in terms of the drive power rate required for driving the vehicle, to be consumed for producing the drive power rate.

3. The control device for the hybrid vehicle according to claim 1, wherein the running efficiency is a proportion of a mass of ingredients, in terms of the drive power rate required for driving the vehicle, which are exhausted from the engine in order to provide the drive power rate while the ingredients are limited from being exhausted.

4. The control device for the hybrid vehicle according to claim 1, further comprising:
   a chargeable and dischargeable power output calculating section calculating a chargeable and dischargeable power output of the electric storage device and operative to serve as a unit to allow the unit operating point, that permit the electric storage device to be charged and discharged within a chargeable and dischargeable power output range, to be assigned to the target value of the unit operating point.

5. The control device for the hybrid vehicle according to claim 1, wherein the target unit operating point calculating section serves as a unit to calculate the target value of the unit operating point so as to interrupt a gear shift for given time interval in the absence of variation in a demanded drive power.

6. The control device for the hybrid vehicle according to claim 5, wherein the target unit operating point calculating section comprises:
   a demanded drive power variation detecting section detecting variation in the demanded drive power output;
   an SOC transition predicting section predicting an SOC transition in a case where in the absence of variation in the demanded drive power, it is assumed that the unit is operated for a given time interval using the preliminarily calculated target unit operating point; and
   a target unit operating point predicting section predicting the target unit operating point based on the target running efficiency calculated on the basis of the predicted SOC transition;
   wherein when an occurrence of the gear shift within the given time interval after prediction of the target unit operating point is predicted, the target unit operating point calculating section serves as a unit to cause the target unit operating point used in a previous calculation to be assigned to the target value of the unit operating point.

7. The control device for the hybrid vehicle according to claim 1, wherein the target unit operating point calculating section serves as a unit wherein when there is the absence of a transition in a gear shift stage from a low speed gear ratio to a high speed gear ratio or from the high speed gear ratio to the low speed gear ratio in a sequence when it is assumed that the unit is operated using the calculated target unit operating point, the target unit operating point used in a previous calculation is assigned to the target value of the unit operating point.

8. A control device for a hybrid vehicle, including a unit having an internal combustion engine, a motor, a stepped power transmission and an electric storage device adapted to supply electric power output to the motor, wherein at least one of power outputs of the internal combustion engine and the motor is transmitted through the stepped power transmission to an output shaft thereof, the control device comprising:

> means for detecting a step of charge (SOC) value indicative of a remaining charged capacity of an electric storage device;
>
> means for calculating a target value of a running efficiency, indicative of a proportion of a given physical quantity, in terms of a drive power rate required for driving the vehicle, in such a manner that the higher the SOC value, the smaller will be the target value to be calculated;
>
> means for calculating a target value of a unit operating point, that forms the target running efficiency, from among operating points of a unit which cause the drive power rate provided by an internal combustion engine to be utilized at the running efficiency with the maximum efficiency; and
>
> target unit operating point actualizing means for controlling the unit such that the unit is operated at the target unit operating point.

9. A control method for a hybrid vehicle, including a unit having an internal combustion engine, a motor, a stepped power transmission and an electric storage device adapted to supply electric power output to the motor, wherein at least one of power outputs of the internal combustion engine and the motor is transmitted through the stepped power transmission to an output shaft thereof, the control method comprising:

> detecting a state of charge (SOC) value indicative of a remaining charged capacity of the electric storage device;
>
> calculating a target value of a running efficiency, indicative of a proportion of a given physical quantity in terms of a drive power rate required for driving the vehicle in such a manner that the higher the SOC value, the smaller will be the target value to be calculated;
>
> calculating a target value of a unit operating point, that forms the target running efficiency, from among operating points of the unit which cause a power rate provided by the internal combustion engine to be utilized at the running efficiency with the maximum efficiency; and
>
> controlling the unit in a way to actualize operation of the unit at the target unit operating point.

* * * * *